United States Patent Office 3,418,378
Patented Dec. 24, 1968

3,418,378
PRODUCTION OF DIPHENYLOL PROPANE
John Denison MacNaughton, St. Lambert, and Jackie Ornstein, Laval, Quebec, Canada, assignors to Shawinigan Chemicals Limited, Montreal, Quebec, Canada, a corporation of Canada
No Drawing. Continuation-in-part of application Ser. No. 385,468, July 27, 1964. This application Oct. 31, 1967, Ser. No. 679,571
7 Claims. (Cl. 260—619)

ABSTRACT OF THE DISCLOSURE

Process for preparing diphenylol propane (para-para isomer) from condensation of acetone and phenol in liquid phenol medium and in presence of hydrogen chloride catalyst, with subsequent isomerization of the byproduct ortho-para isomer to the para-para isomer to improve product purity, using restricted proportions of excess phenol and temperatures for condensation and isomerization which maintain the para-para isomer product predominantly in the solid phase during the condensation and isomerization.

---

This application is a continuation-in-part of application Ser. No. 385,468 filed July 27, 1964, now abandoned, by John D. MacNaughton and Jackie Ornstein.

This invention relates to the production of 2,2-(4,4'-dihydroxy-diphenyl) propane, generally referred to briefly as diphenylol propane. More particularly the invention relates to the production of diphenylol propane by a process similar to known processes but modified by control of the temperature and proportions of ingredients during reaction to minimize byproduct formation and produce a product of high quality and purity without the need for any purification operation.

It is known that phenol and acetone react, in the presence of anhydrous hydrogen chloride or concentrated hydrochloric acid as a condensing agent and of excess phenol and optionally in the presence of specific promoters of the reaction, for example beta-mercapto propionic acid, to form predominantly diphenylol propane. The use of mercapto-substituted aliphatic carboxylic acids as specific promoters of this reaction is disclosed in U.S. Patent 2,468,982 of J. E. Jansen. The major contaminant which is found in the product so produced is an isomer of the desired 2,2-(4,4'-dihydroxy-diphenyl) propane, namely 2,2-(2,4'-dihydroxy-diphenyl) propane. The desired product can be referred to briefly as the para-para isomer, and the foregoing major contaminant as the ortho-para isomer of diphenylol propane. The advent of chromatographic methods of analysis has provided means for ascertaining the relative concentrations of the foregoing isomers in the diphenylol propane product of these prior art processes for the production of diphenylol propane.

It has unexpectedly been found that the two foregoing isomers, under the conditions of reactions for condensation of phenol with acetone previously referred to, are each isomerizable to the form of the other and the two isomeric forms are in some type of equilibrium with each other, the relative concentrations of each of the isomers in the equilibrium mixtures in phenol solution being a function primarily of the temperature, and to some extent of the concentration of hydrogen chloride present. Decreasing proportions of the ortho-para isomer are found to exist in equilibrium with the para-para isomer in phenol solution at decreasing temperature. The conversion of the ortho-para isomer to the para-para isomer appears to be a slightly exothermic reaction. It has further been found that the para-para isomer is far less soluble in liquid phenol than is the ortho-para isomer. It has also been found that the proportion of the ortho-para isomer formed during condensation of phenol and acetone to diphenylol propane at any particular reaction temperature is higher than the proportion of ortho-para isomer which remains in equilibrium with para-para isomer in phenol solution in the presence of hydrogen chloride at that particular temperature. These discoveries have made it possible to reduce large proportions of contaminating ortho-para isomer in diphenylol propane to much smaller proportions by isomerizing them to the para-para isomer, which is generally the desired product and is thus more nearly pure and of correspondingly higher quality.

The invention thus consists in a process for preparing 2,2-(4,4'-dihydroxy-diphenyl) propane comprising condensing acetone with phenol at temperatures not over 60° C. in the presence of an excess of from two and above, to below eight moles of phenol per mole of acetone and of a condensation catalyst of the group consisting of hydrogen chloride, aqueous hydrochloric acid, and mixtures thereof to form a reaction mixture, continuing the reaction until the acetone has been entirely consumed and there is produced 2,2-(4,4'-dihydroxy-diphenyl) propane admixed with 2,2-(2,4'-dihydroxy-diphenyl) propane, said 4,4' isomer being predominantly in the solid phase, maintaining the mixture at a temperature at least as low as the temperature at which the condensation reaction was carried out for at least one hour to isomerize a proportion of the 2,4'-isomer to the 4,4'-isomer and to allow the isomers to achieve substantially an equilibrium by isomerization, applying a vacuum and rapidly removing the hydrogen chloride from the isomers and separating phenol from the isomers by distillation.

From the foregoing statement of the invention it can be seen that the basic step of condensing phenol with acetone, in the ratio of two moles of phenol per mole of acetone to form diphenylol propane, is carried out in presence of only a slight excess of phenol which preferably is minimized in order to achieve the high product purity which is attainable by means of the invention; furthermore, both the condensation reaction and the subsequent isomerization step are carried out in a restricted temperature range from 60° C. down to the temperature somewhat below 40° C. at which the excess phenol acting as solvent and containing some dissolved product, passes from the liquid to the solid phase. Restriction of the temperature to this low portion of the wide range of temperature which is already known to be operable for the condensation of phenol and acetone has been found to be critical in order to minimize the production of undesired byproducts. The foregoing combination of reaction conditions creates a circumstance in which the reaction product is present predominantly in the solid phase in the reaction medium, both during the condensation reaction and the isomerization steps.

As is well known, diphenylol propane is soluble to some extent in liquid phenol, and crystallizes therefrom as a crystalline solid adduct of diphenylol propane and phenol. The environment of phenol in which the isomerization described above is carried out is thus to a limited extent a solvent medium for the diphenylol propane isomers with the para-para isomer being less soluble than the ortho-para isomer, and from which medium they can crystallize as crystalline solid adduct, either through formation of new diphenylol propane by condensation of phenol and acetone in the medium or through cooling of the medium to lower the solubility of the adduct. It appears that the isomerization of ortho-para to para-para isomer proceeds closer to completion with the diphenylol propane predominantly in the solid state. As it is generally desired to isomerize ortho-para isomer to para-para isomer, the best way to carry out the desired isomerization is at the lowest convenient temperature, specifically 60° C. and lower, preferably below 50° C., and most preferably about 40° C. or lower.

To achieve the maximum proportion of diphenylol propane in the solid state, to avoid excessive dilution of the isomers in the phenol medium in which the isomerization is carried out, and to facilitate recovery of desired product therefrom, it is preferred that the proportion of phenol with respect to the isomers be as low as possible. As a practicable matter, usually about two to three moles of phenol per mole of diphenylol propane in the phenol are preferred and used; higher proportions, for example the proportions below eight moles of phenol per mole of diphenylol propane, are operable but such higher proportions result in increasingly higher proportions of undesired ortho-para isomer. Proportions lower than two moles of phenol per mole of diphenylol propane may not provide adequate medium for the isomerization, and hence are not recommended; they are generally insufficient to permit easy mechanical handling of the isomerizing material which preferably is maintained as a slurry of crystalline solids in liquid phenol.

The period of time which is required for a mixture of ortho-para and para-para isomers to achieve an equilibrium under the isomerizing conditions described herein varies with the temperature and other factors which naturally affect the rate of equilibration. Usually a period of less than twelve hours is more than adequate, and periods of at least one hour normally are required, with periods of two to eight hours most commonly being both convenient and adequate.

The isomerization on which this invention is based has not been found to occur to an observable extent in the absence of hydrogen chloride. The proportion of hydrogen chloride present during equilibration is most preferably sufficient to saturate any liquid phase present with the equilibrating mixture, including water and phenol; such saturating proportions can vary from 1.5% to 10% by weight of the reaction mixture, but lower proportions, for example down to 1% and less by weight of the equilibrating reaction mixture, are operable although not preferred. The temperature conditions preferred for the condensation reaction and the desired equilibration of isomers thus are 60° C. and lower, more preferably 50° C. and lower, most preferably 40° C. and lower, said equilibration temperature condition being at least as low as and preferably below the temperature at which the condensation reaction forming the isomers was completed and ensuring the presence of the desired isomer predominantly in the solid phase.

The invention is illustrated but not limited by the following examples of specific embodiments thereof.

Example 1

Into a three-neck one litre glass flask equipped with a cooling and heating bath, stirrer, thermometer, vent to atmosphere, and gas sparger for dispersing hydrogen chloride gas into the flask, were charged 675 gm. molten phenol, 93 gm. acetone, and 1.35 ml. beta-mercapto propionic acid. The resulting mixture in the flask was cooled to 30° C., and a continuous stream of anhydrous gaseous hydrogen chloride was sparged rapidly into the mixture to catalyze the condensation of the acetone with the phenol. As the condensation proceeded the temperature of the reaction mixture began to rise; within one hour it reached 40° C. and was precluded from rising further and maintained at about 40° C. for the next six hours, during all of this time hydrogen chloride being continuously sparged into the reaction mixture. During the reaction the hydrogen chloride concentration in the mixture achieved a maximum value of 2.85% by weight of the total mixture as determined by periodic analyses. Crystals of the solid adduct of diphenylol propane and phenol precipitated in the mixture and formed a thick slurry as the condensation proceeded. At the end of about two and one-half hours the acetone had been entirely consumed and the condensation reaction was complete. During the ensuing four and one-half hours the slightly exothermic isomerization of the ortho-para isomer 2,2-(2,4'-dihydroxy-diphenyl) propane to the para-para isomer 2,2-(4,4'-dihydroxy-diphenyl) propane occurred until a pseudo-equilibrium in the relative concentration of the two isomers was reached. Periodic chromatographic analysis of the mixture of isomers during and at the end of seven hours established that the relative proportions of the isomers at the pseudo-equilibrium were 0.6% ortho-para isomer and 99.4% para-para isomer. To recover the diphenylol propane product, the reaction flask was connected to a vacuum line to distill off the hydrogen chloride rapidly under the vacuum while the flask was gradually heated to 90° C. When the hydrogen chloride had all been removed the flask was further heated under vacuum to distill off water and phenol up to a temperature of 160° C. The remaining traces of phenol in the residue were removed by steam stripping to leave a residue of product diphenylol propane. This product had a melting point of 156.4° C. and by comparison with calibrated samples analyzed by chromatographic analysis had an ortho-para isomer content of about 1.1% by weight.

Example 2

Into a 3-neck, 1-litre, glass flask equipped with a cooling and heating bath, stirrer, thermometer, vent to atmosphere, and gas sparger for dispersing hydrogen chloride gas into the flask was charged 675 gm. molten phenol, 93 gm. acetone, and 1.35 ml. betamercapto propionic acid. The resulting mixture was cooled to 30° C. and a continuous stream of anhydrous gaseous hydrogen chloride was sparged rapidly into the mixture to catalyze the condensation of the acetone with the phenol. As the condensation proceeded the temperature of the mixture began to rise; within 38 minutes it had reached 60° C. and was precluded from rising further and maintained at about 60° C. for the next five hours, during all of this time hydrogen chloride being continuously sparged into the reaction mixture. Crystals of the solid adduct of diphenylol propane and phenol precipitated in the mixture and formed a thick slurry as the condensation proceeded.

The residual acetone content of periodic samples of the reaction mixture was determined by standard hydroxylamine hydrochloride titration and the percentage of ortho-para isomer, based on the weight of the total of ortho-para and para-para isomers in the reaction mixture at the same time, was determined by gas-liquid chromatography. During the condensation reaction, i.e., with acetone still present in the reaction mixture in significant proportions, the proportion of ortho-para isomer rose to a maximum of 4.7% but within two hours of completion of the condensation reaction the proportion of ortho-para isomer had dropped to 1.7% by weight of the total isomers. The diphenylol propane product could be recovered from the reaction flask in the manner outlined in the preceding example. Such recovered product, by comparison with calibrated samples analyzed by chromatographic analysis, has a melting point of about 156° C. The lower proportion of ortho-para isomer in the product equilibrated at 40° C. in Example 1 illustrates the superiority of isomerizing at temperature lower than the 60° C. used in Example 2.

The foregoing examples have illustrated the operation of the invention as a batch process. However, process steps involved with the invention can also be carried out as continuous operations instead of the batch operations previously exemplified. Thus phenol, acetone, hydrogen chloride condensation catalyst, and if desired a promoter such as beta-mercapto propionic acid can be introduced continuously in appropriate ratios as hereinbefore disclosed, into a reaction zone to cause condensation to form diphenylol propane at appropriate temperatures as hereinbefore disclosed, the resulting reaction mixture containing this product in excess phenol continuously withdrawn from the reaction zone and continuously passed through an isomerization zone, or series of zones, under appropriate conditions of temperature, time, etc. as hereinbefore indicated to facilitate isomerization of the ortho-para isomer of diphenylol propane to the para-para isomer, the resulting mixture containing the isomerized material then being passed continuously to a vacuum evaporation zone to remove hydrogen chloride rapidly therefrom and the diphenylol propane product finally separated from the remaining mixture by appropriate continuous distillation steps. As has been indicated previously herein, isomerization of ortho-para to para-para diphenylol propane proceeds closer to completion with the desired isomer predominantly in the solid state. Hitherto, for ease of handling the material in continuous operations, the condensation reaction has been carried out in a large excess of molten phenol from which the diphenylol propane was subsequently recoverd, as shown for example in U.S. Patent 2,730,553. Such operation does not achieve the advantageous result achieved by the present invention, as can be seen from comparison of the subsequent Example 3 and the comparative example based on the disclosure of U.S. Patent 2,730,553.

Example 3

In this example the process of the invention was carried out as a continuous operation in a series of four temperature regulated kettles, the first three each having an effective volume capacity of 1500 imperial gallons and the fourth having an effective volume capacity of 500 imperial gallons. A liquid mixture of 92.2% phenol, 7.8% actone (mole ratio 7.32:1, i.e., an excess of 5.32 moles phenol per mole acetone) was pumped continuously to the first kettle in the series at a rate of 270 imperial gallons per hour; a volume of 1500 gallons of reactants was maintained in the first kettle by continuously pumping ingredients therefrom to the second, third, and fourth kettles in succession, each of which were maintained filled to their effective volume capacities. Hydrogen chloride also was introduced into each of the first two kettles to keep the contents thereof saturated with hydrogen chloride. As reaction promoter, charges of 32 ounces of beta-mercapto propionic acid were introduced into the first kettle at intervals of about four hours, to maintain an effective concentration of this ingredient in the reaction mixture. Temperatures in the succession of four kettles were maintained at 42° C., 39° C., 39° C., and 42° C. respectively by cooling. Product withdrawn from the fourth kettle was vacuum distilled to flash off the hydrogen chloride, then fractionally distilled to separate the phenol from the diphenylol propane product. When dynamic equilibrium conditions of continuous operation were established, the resulting diphenylol propane was found to have a melting point of 156.2° C., corresponding to an ortho-para isomer content of 1.5% by weight of the product.

Comparative example

In this example the operating conditions for the preparation of diphenylol propane were a duplication of typical conditions disclosed in U.S. Patent 2,730,553, specifically Example V. The reaction of phenol and acetone was carried out as a continuous operation using two one-litre flasks in series, each fitted with a stirrer and thermometer. Flask I had a vent line to a trap connected to absorbers and a side-arm which was connected to a top inlet of flask II; flask II was equipped with a bottom draw-off. During the course of the reaction the contents of each flask was continually stirred and the temperature maintained at 65° C. ±2° C. by means of a heated water bath for flask I and an electric mantle for flask II. Anhydrous hydrogen chloride was continuously sparged into flask I at a rate sufficient to maintain dissolved hydrogen chloride in the reaction mixture in a proportion of about 6% by weight of the theoretical yield of phenol-acetone condensation product. Liquid feed was continuously added to the flask I below the side-arm thereof from a graduated funnel, the rate being 12 ml. per minute in order to maintain a residence time of reaction mixture in flask I of one hour. The overflow from flask I passed via the side-arm to flask II and, after accumulation of the charge for one hour in flask II, a continuous draw-off therefrom was started and thereafter maintained at the same flow rate as the feed to flask I. The continuous liquid feed to flask I was made up of phenol and acetone (in a mol ratio of 10:1) with methyl mercaptan promoter dissolved therein (in an amount of 1% by weight of the theoretical yield of phenol-acetone condensation product) by combining the ingredients in proportions of 940 gm., 58 gm., and 2.26 gm. respectively. The draw-off of crude product mixture from flask II was analyzed by means of gas-liquid chromatography to determine the proportions of para-para and ortho-para isomers present. In duplicate runs the proportion of ortho-para isomer in the product draw-off, after dynamic equilibrium conditions of continuous operation had been established, varied between 5.5% and 6.7% by weight of the mixture of othro-para and para-para isomers.

Comparison of the two preceding examples shows that observance of the conditions critical to the present invention, viz: condensation of acetone and phenol and subsequent isomerization of byproduct ortho-para diphenylol propane both in presence of excess of phenol below a specified proportion and at temperature below a specified maximum so that the product para-para diphenylol propane is present predominantly in the solid phase, results in products containing unexpectedly lower proportions of by-product ortho-para isomer than are produced when such conditions are not observed. Thus reduction of the ortho-para isomer content of diphenylol propane to an order of magnitude of about 1.5% from an order of magnitude of about 6% constitutes elimination of about 75% of the major impurity present in diphenylol propane. Such improvement could not be predicted from prior art knowledge of the preparation of diphenylol propane.

Water is formed as a co-product in the condensation of phenol with acetone, and it was previously known that aqueous hydrochloric acid could be used as the condensation catalyst in lieu of gaseous hydrogen chloride. In order to obtain optimum advantage of the present invention it has been found preferable to utilize a small proportion of aqueous hydrochloric acid as condensation catalyst for the preparation of diphenylol propane as well as to keep the reaction mixture saturated with hydrogen chloride gas. Under these conditions of simultaneous use of aqueous hydrochloric acid and gaseous hydrogen chloride to saturate the reaction mixture, it is found that the optimum ratios of the desired para-para isomer to the contaminant ortho-para isomers are obtained. Obviously water can be added in lieu of aqueous hydrochloric acid as long as the reaction mixture is kept saturated with hydrogen chloride, the added water becoming aqueous hydrochloric acid upon addition of the hydrogen chloride gas. However, the water formed as a product in the condensation cannot be considered as effective for purposes of catalysis of the condensation reaction, for it has been observed that only with added water or aqueous hydrochloric acid, combined with hydrogen chloride saturation, can the optimum ratio of desired para-para isomer of diphenylol propane be obtained.

It has been found that the inclusion of aqueous concentrated hydrochloric acid in a proportion as low as 0.05% by weight of the reactants can repress the equilibrium concentration of ortho-para isomer in admixture with para-para isomer of diphenylol propane, and under most favored conditions a proportion of 0.33% by weight of the reactants was found to repress the equilibrium concentration of ortho-para isomer to an undetectably low value. Operations with higher proportions of aqueous hydrochloric acid, e.g., 0.65%, 1%, and up to 3% by weight of the reaction mixture, have shown that such proportions likewise are suitable to repress the equilibrium proportion of ortho-para isomer. Such larger proportions are not necessary, however, and the proportions between 0.3% and 1% are preferred. Smaller proportions also are operative.

It is remarkable that such low proportions of aqueous hydrochloric acid have such an effect when it is realized that, by weight of the reactants in the foregoing example, 2.4% of water is formed in the reaction. Such water, if released as free water in the reaction, must become acidic with the hydrogen chloride gas being sparged into the reaction mixture, and with addition of sufficient hydrogen chloride, become saturated. As the presence of such water or aqueous hydrochloric acid formed in situ does not appear to affect the relative isomer proportions appreciably, it is possible that the water formed in situ is bound in some way with other products and is not available to affect the proportions of isomers. However the mechanism for the suppressive action of small proportions of aqueous hydrochloric acid or additional water saturated in situ with hydrogen chloride cannot be said to be known, and the claimed invention is not to be limited by any theory of the mechanism of the invention.

Numerous other variations and modifications can be made in the expedients herein described without departing from the invention, the scope of which is defined in the following claims.

What is claimed is:

1. A process for preparing 2,2-(4,4'-dihydroxy-diphenyl) propane comprising condensing acetone with phenol at a temperature of about 40° to not over 60° C. in the presence of an excess of from two and above, to below eight moles of phenol per mole of acetone and of a condensation catalyst of the group consisting of hydrogen chloride, aqueous hydrochloric acid, and mixtures thereof to form a reaction mixture, continuing the reaction until the acetone has been entirely consumed and there is produced 2,2-(4,4'-dihydroxy-diphenyl) propane admixed with 2,2-(2,4'-dihydroxy-diphenyl) propane, said 4,4'-isomer being predominantly in the solid phase, and subsequently maintaining the mixture at a temperature at least as low as the temperature at which the condensation reaction was carried out for at least two hours to isomerize a proportion of the 2,4'-isomer to the 4,4'-isomer and to allow the isomers to achieve substantially an equilibrium by isomerization, applying a vacuum and rapidly removing the hydrogen chloride from the isomers and separating phenol from the isomers by distillation.

2. A process as claimed in claim 1 wherein the reaction mixture is saturated with hydrogen chloride.

3. A process as claimed in claim 2 wherein the catalyst is a mixture of hydrogen chloride gas and water saturated with hydrogen chloride.

4. A process as claimed in claim 3 wherein the water saturated with hydrogen chloride in the catalyst mixture is from 0.05% to 3% by weight of the reaction mixture.

5. A process as claimed in claim 4 wherein the mixture is maintained at a temperature of about 40° C.

6. A process as claimed in claim 5 in which the condensation and isomerization are carried out continuously by passage of the reactants through a series of condensation and isomerization zones.

7. A process as claimed in claim 6 in which there are four reaction and isomerization zones.

No references cited.

LEON ZITVER, *Primary Examiner.*

H. ROBERTS, *Assistant Examiner.*